United States Patent [19]
Wentworth et al.

[11] 3,841,240
[45] Oct. 15, 1974

[54] CONTINUOUS FLUID BED WIRE BURN-OFF APPARATUS AND METHOD

[75] Inventors: Hobart L. Wentworth, Barrington, Ill.; Karl H. Seelandt, Contoocook, N.H.

[73] Assignee: Sola Basic Industries, Inc., Milwaukee, Wis.

[22] Filed: July 6, 1973

[21] Appl. No.: 377,131

[52] U.S. Cl. ............... 110/8 R, 110/8 C, 110/28 J
[51] Int. Cl. .............................................. F23g 5/00
[58] Field of Search ............ 110/8 R, 8 C, 18 R, 15, 110/14, 28; 432/16, 197

[56] References Cited
UNITED STATES PATENTS

| | | | |
|---|---|---|---|
| 2,139,419 | 12/1938 | Moreton | 110/14 |
| 2,852,418 | 9/1958 | MacDonald | 110/8 X |
| 3,117,064 | 1/1964 | Friedrich | 432/16 X |
| 3,250,521 | 5/1966 | Sergent | 432/197 X |
| 3,346,417 | 10/1967 | Ehrlich | 110/8 X |
| 3,397,657 | 8/1968 | Tada | 110/28 X |
| 3,702,595 | 11/1972 | Muirhead et al. | 110/28 |

*Primary Examiner*—Kenneth W. Sprague
*Attorney, Agent, or Firm*—Smythe & Moore

[57] ABSTRACT

A continuous fluid bed industrial furnace system has an inclined porous diffusion bottom member upon which is positioned a bed of fluidizable granular material. A fluid is introduced through the bed to fluidize the granular material and to cause the granular material to move downwardly on the inclined surface. Material to be heated, such as insulated wire, is introduced at the upper end of the bed and conveyed along the bed during the heating process. The granular material is separated from the heated material at the lower end of the bed and is returned to the upper end of the bottom surface.

8 Claims, 1 Drawing Figure

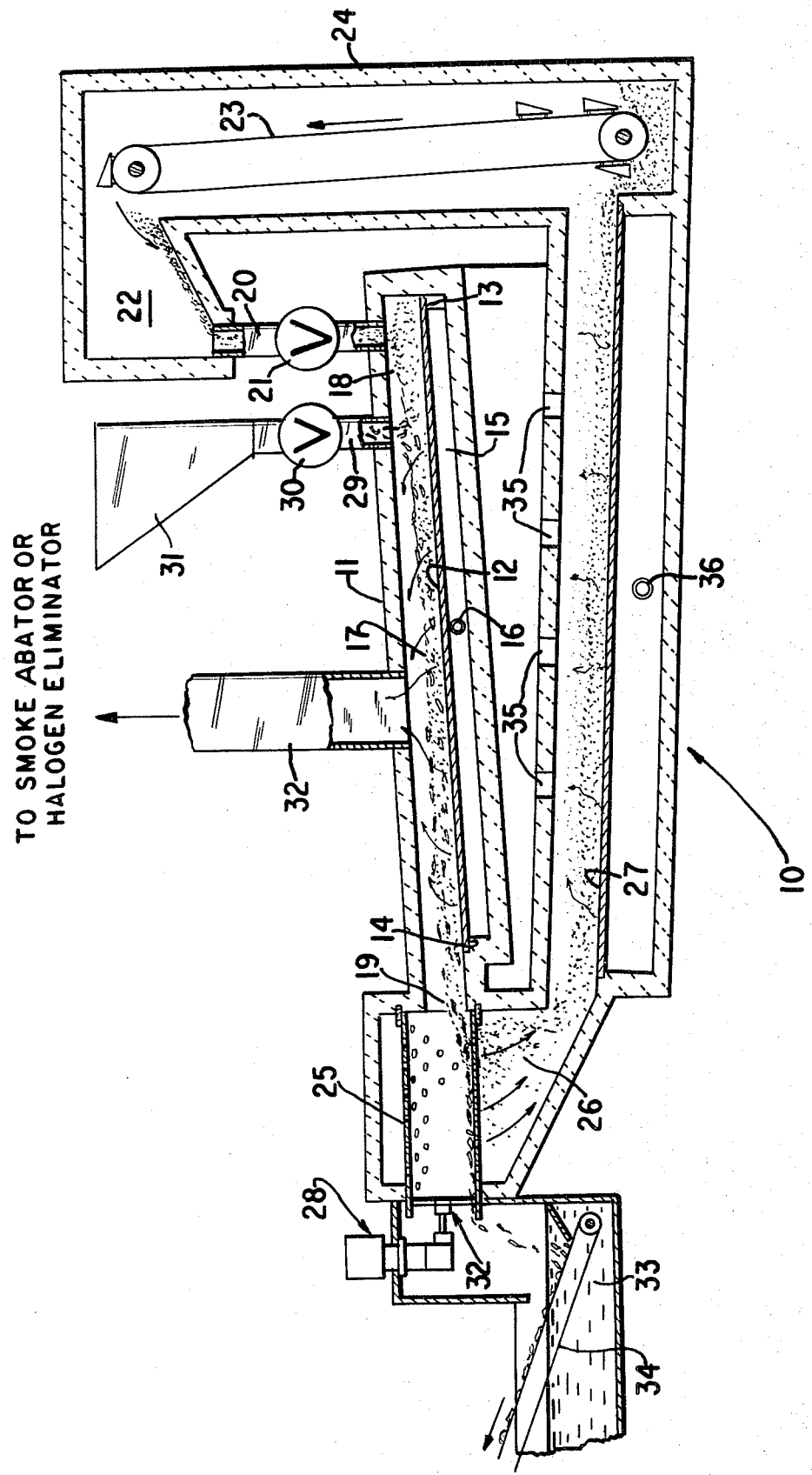

CONTINUOUS FLUID BED WIRE BURN-OFF APPARATUS AND METHOD

The present invention relates to a fluid bed industrial furnace system and, particularly, to such a furnace which has a continuously moving fluid bed therein.

A fluid bed industrial furnace essentially comprises a bed of granular material through which a fluid is directed upwardly in order to fluidize the bed. A suitable heating means is adjacent the fluid bed to heat the bed. The material which is to be subjected to the action of the furnace is generally positioned in a work basket which then may be immersed in the heated fluid bed. The uniformity of heat transfer within the fluid bed subjects all portions of the workpiece material to substantially uniform thermal action. Upon completion of the heat treating process, the work basket is removed, the material discharged therefrom, and the process is repeated. Therefore, such a fluid bed furnace is essentially a batch operation. It is considered desirable to provide such a fluid bed furnace which would be continuous in operation.

One of the objects of the present invention is to provide an improved continuous fluid bed furnace system.

Another of the objects of the present invention is to provide a continuous fluid bed furnace within which the granular material constituting the fluid bed can be recirculated.

Another of the objects of the present invention is to provide a continuous fluid bed furnace system which can be used to remove insulation from wire or other material.

According to one aspect of the present invention, a continuous fluid bed industrial furnace system may comprise a chamber within which is positioned an elongated porous diffusion bottom member. One end of the bottom member is higher than the other end so as to be inclined at a small angle. Means is provided for introducing a fluidizable bed of granular material at the upper end of the bottom member. A fluid is directed upwardly through the bed of granular material to fluidize the granular material and thereby to cause the granular material to move downwardly along the inclined bottom member. Means also are provided for heating the granular material before it is introduced onto the upward end of the bottom member.

The materials or workpieces to be heated also are introduced onto the fluid bed at the upper end of the bottom member. Means are provided at the lower end of the bottom member for separating the granular material from the treated material. The separated granular material is then conveyed to the upper end of the bed so as to be reintroduced thereon as a fluid bed. The granular material may be heated as it is being conveyed from the lower to the upper end of the bed.

Other objects, advantages, and features of the invention will become apparent from the accompanying description and drawings which are merely exemplary.

In the drawing there is shown a verticular sectional view of a fluid bed furnace system according to the present invention.

In the drawing, there is illustrated generally at 10 a continuous fluid bed industrial furnace system. The furnace 10 comprises a main frame in which is formed a chamber 11 fabricated of heat resistant material. The chamber 11 is inclined at a slight angle, and in the lower portion of the chamber, a bottom diffusion member 12 is positioned which may comprise a layer of porous refactory material. The diffusion member 12 may be supported upon a perforated plate (not shown) but which is known in the art, which can have its ends supported on ledges 13 and 14 or in any suitable manner. A plenum chamber 15 is formed beneath the bottom member 12. A fluid, which may be air or other suitable gas, is introduced through an air inlet 16 from a suitable supply.

Within the chamber 11 there is disposed upon the bottom plate 12 a fluid bed 17 which is a mass of non-agglomerative, granular material, through which a sufficient upward flow of fluid maintains a condition analogous to that of a fluid. The bed may comprise silica sand or granular particles of alumina, silicon carbide or other refractory materials. The bed 17 is about one foot in depth and the bottom member 12 can be inclined at a slope of about 2–3 percent or a suitable slope so that the fluidized material will move down the incline. Fluidizing the granular material constituting the bed cause the bed to move continuously downwardly along the sloping bottom member from the upper end of the chamber indicated at 18 to the lower end thereof indicated at 19.

The granular material is introduced into the upper end 18 of the chamber through a conduit 20 in which is positioned a control valve 21. The conduit 20 leads from the lower end of a hopper 22 which is supplied with the granular material by means of an elevating conveyor 23.

The granular material is dumped into the bottom of a vertical chamber 24 in which is mounted the conveyor 23. As the granular material leaves the lower end 19 of the chamber, it enters one end of a rotating cylindrical perforated drum 25 through which the sand passes downwardly as shown at 26 to enter on a sloping surface 27 along which the granular material moves to the bottom of the vertical chamber 24. The drum 25 is rotated by a suitable motor and a drive mechanism indicated at 28.

The material which is to be heated or treated is introduced through conduit 29 having a control valve 30 and connected to the lower end of a hopper 31. Where the furnace is to be used for burning insulation off of copper or conductors in electrical machinery so as to recover the scrap metal, the insulation covered workpieces are dumped into the hopper 31 from which they are introduced onto the fluid bed 17. As these pieces move along the fluid bed, the insulation is burned off and the resulting products of combustion are exhausted through exhaust conduit 32 where they are passed to a smoke abater or halogen eliminator.

As the granular material and pieces of copper from which the insulation has been burned off enter the rotating drum 25, the heated material is separated from the granular material and the heated material is discharged from discharge end 32 of the drum into a water bath 33 for cooling purposes. A conveyor 34 may be provided for removing the stripped wire conductors from the cooling bath.

As the granular material moves along the inclined surface 27, it can be heated by burners at 35 or by electrical heaters which are known in the art and are not shown.

The inclined surface 27 may comprise a suitable conveyor for moving the granular material or it may comprise a porous diffusion member similar to the bottom member 12 in chamber 11. In this event, a fluid such as air is introduced through inlet 36 and directed upwardly through the granular material to fluidize the granular material and to cause the fluidized material to move along the inclined surface 27 to the lower end of vertical chamber 24. This bottom conveyor slope 27 may have an inclination of 2–7 percent.

Describing the operation, as air under suitable pressure is introduced through inlets 16 and 36, the air will be diffused upwardly through the diffusion member so as to cause the entire fluid bed to fluff slightly and then settle back to a state resembling a boiling liquid. The intensity of the boiling action can be varied by increasing or decreasing the air pressure.

Since the granular material constituting the fluid bed is continuously recirculated, it is apparent that this fluid bed furnace is continuous in operation. The material or wire to be heated are introduced at the upper end of the downwardly moving fluid bed and removed from the lower end thereof. The material being treated may become immersed in the granular material, but this is immaterial since the workpiece will be separated from the granular material by the rotary separator drum or other separating means. The bed may be heated to temperatures in the range of 200°–1,500° F. or above depending upon the material of the bed, the heating unit, and the process to be carried out.

It is to be understood that changes in various details of construction and arrangement of parts may be made without departing from the spirit of the invention except as defined in the appended claims.

What is claimed is:

1. In a continuous fluid bed industrial furnace system, the combination of elongated first chamber means, an elongated porous diffusion bottom member within said first chamber having inlet and outlet means at the opposing ends thereof, said inlet end being higher than the other end so as to be inclined at a small angle, said inlet means introducing a fluidizable bed of granular material at the higher end of said bottom member to form a bed of granular material thereon, means for directing a fluid upwardly through said bed of granular material to fluidize the granular material and cause the fluidized material to move downwardly along the inclined bottom member, and means for heating said granular material, means for introducing material to be treated onto the higher end of said bottom member, an open ended cylindrical drum at the lower end of said inclined bottom member, means for rotating said drum, a second elongated chamber extending at an angle below and from said drum rearwardly of said chamber means, and conveyor means arranged at and extending vertically of said chamber means and communicating with the outlet means of said second chamber and the inlet means of said first chamber whereby said granular material and material being treated is separated by said drum and said granular material is returned by said second chamber and said conveyor to said diffusion bottom member to provide continuous treatment.

2. In a continuous fluid bed industrial furnace system the combination of chamber means, an elongated porous diffusion bottom member within said chamber having one end higher than the other end so as to be inclined at a small angle, means for introducing a fluidizable bed of granular material at the higher end of said bottom member to form a bed of granular material thereon, means for directing a fluid through said bed of granular material to fluidize the granular material and cause the fluidized material to move downwardly along the inclined bottom member, and means for heating said granular material while it is being conveyed, and means for conveying granular material from the lower end of said bottom surface back to said introducing means so that the granular material is circulated.

3. A continuous fluid bed industrial furnace system as claimed in claim 2 and comprising means at the lower end of said inclined bottom surface for separating granular material from the treated material.

4. A continuous fluid bed industrial furnace system as claimed in claim 3 wherein said separating means comprises a rotating cylindrical drum having one end at the lower end of said inclined bottom member.

5. A continuous fluid bed industrial furnace system as claimed in claim 4 with a discharge opening at the other end of said drum.

6. A continuous fluid bed industrial furnace system as claimed in claim 5 and comprising a water bath at said discharge opening to receive heated material therein.

7. A continuous fluid bed industrial furnace system as claimed in claim 1 and comprising means on said chamber for exhausting gases formed during the heating process thereon.

8. A continuous fluid bed industrial furnace system as claimed in claim 1 and including means for introducing wire having insulation thereon onto said bed so as to remove the insulation on said wire.

* * * * *